US011916701B2

(12) United States Patent
Viswambharan et al.

(10) Patent No.: US 11,916,701 B2
(45) Date of Patent: Feb. 27, 2024

(54) COORDINATED OBSERVABILITY FOR DYNAMIC VPN SWITCHOVER

(71) Applicant: Cisco Technology, Inc., San Jose, CA (US)

(72) Inventors: Rajesh Indira Viswambharan, Bangalore (IN); Vinay Saini, Bangalore (IN); Ram Mohan Ravindranath, Bangalore (IN); Nagendra Kumar Nainar, Morrisville, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 105 days.

(21) Appl. No.: 17/502,141

(22) Filed: Oct. 15, 2021

(65) Prior Publication Data

US 2023/0124886 A1   Apr. 20, 2023

(51) Int. Cl.
*H04L 12/46* (2006.01)
*H04L 12/66* (2006.01)

(52) U.S. Cl.
CPC .......... *H04L 12/4641* (2013.01); *H04L 12/66* (2013.01)

(58) Field of Classification Search
CPC ............................ H04L 12/4641; H04L 12/66
See application file for complete search history.

(56) References Cited

U.S. PATENT DOCUMENTS

| | | |
|---|---|---|
| 8,776,209 B1 | 7/2014 | Kumar et al. |
| 10,257,167 B1 | 4/2019 | Matthews et al. |
| 10,601,779 B1 | 3/2020 | Matthews et al. |
| 11,356,419 B1 * | 6/2022 | Nosalis ................. G06F 16/252 |
| 2009/0228973 A1 | 9/2009 | Kumar et al. |
| 2014/0101317 A1 | 4/2014 | Yoon |
| 2017/0099159 A1 * | 4/2017 | Abraham .............. H04L 65/102 |
| 2022/0337480 A1 * | 10/2022 | Vanajakshi ......... H04L 12/4641 |
| 2022/0368675 A1 * | 11/2022 | Narula ................ H04L 43/0817 |

OTHER PUBLICATIONS

Kesavan, Archana, "How Virtual Private Networks Impact Performance", online: https://www.thousandeyes.com/blog/how-virtual-private-networks-impact-performance/, Feb. 14, 2017, 9 pages, ThousandEyes, Inc.
"VPN Monitoring: Troubleshooting Suboptimal VPN Connectivity—Part 1: VPN Monitoring Series", online: https://www.thousandeyes.com/resources/troubleshooting-suboptimal-vpn-connectivity-tutorial, accessed Jun. 29, 2021, 15 pages, www.thousandeyes.com.
Kesavan, et al., "ThousandEyes Webinar Series: VPN Monitoring for a Remote Workforce", online: https://www.thousandeyes.com/resources/vpn-monitoring-remote-workforce-webinar#mktoForm_1108, accessed Jun. 29, 2021, 56 pages, www.thousandeyes.com.

* cited by examiner

*Primary Examiner* — Luat Phung
(74) *Attorney, Agent, or Firm* — BEHMKE INNOVATION GROUP LLC; James M. Behmke; James J. Wong

(57) ABSTRACT

In one embodiment, a method herein comprises: establishing, by a process, a virtual private network connection (VPN connection) with a particular VPN gateway; requesting, by the process, observability monitoring through the particular VPN gateway, wherein requesting results in a controller being informed about the particular VPN gateway and a domain of the particular VPN gateway; receiving, by the process, test specifics from the controller based on the particular VPN gateway and the domain of the particular VPN gateway; and executing, by the process, one or more tests to the particular VPN gateway based on the test specifics.

20 Claims, 9 Drawing Sheets

COORDINATED OBSERVABILITY FOR DYNAMIC VPN SWITCHOVER

TECHNICAL FIELD

The present disclosure relates generally to computer systems, and, more particularly, to coordinated observability for dynamic VPN switchover.

BACKGROUND

The Internet and the World Wide Web have enabled the proliferation of web services available for virtually all types of businesses. Due to the accompanying complexity of the infrastructure supporting the web services, it is becoming increasingly difficult to maintain the highest level of service performance and user experience to keep up with the increase in web services. For example, it can be challenging to piece together monitoring and logging data across disparate systems, tools, and layers in a network architecture. Moreover, even when data can be obtained, it is difficult to directly connect the chain of events and cause and effect.

In addition, virtual private network (VPN) usage has reached unprecedented height during recent times, and this trend adds more challenges on information technology (IT) departments to timely identify and isolate the issues reported by the users. These challenges are particularly exacerbated due to the use of distributed VPN gateways, and the general lack of observability into VPN gateway behavior, especially as users move from one VPN gateway to another.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a method comprises: establishing, by a process, a virtual private network connection (VPN connection) with a particular VPN gateway; requesting, by the process, observability monitoring through the particular VPN gateway, wherein requesting results in a controller being informed about the particular VPN gateway and a domain of the particular VPN gateway; receiving, by the process, test specifics from the controller based on the particular VPN gateway and the domain of the particular VPN gateway; and executing, by the process, one or more tests to the particular VPN gateway based on the test specifics.

According to one or more additional embodiments of the disclosure, a method comprises: receiving, at a controller, a request for observability monitoring for a virtual private network connection (VPN connection) from an end user device; determining, by the controller, a particular VPN gateway with which the end user device has established the VPN connection, and a particular domain of the particular VPN gateway; determining, by the controller, test specifics for observability monitoring based on the particular VPN gateway and the particular domain of the particular VPN gateway; and instructing, by the controller, the end user device of the test specifics to cause the end user device to execute one or more tests to the particular VPN gateway based on the test specifics.

Other embodiments are described below, and this overview is not meant to limit the scope of the present disclosure.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Figure 1:
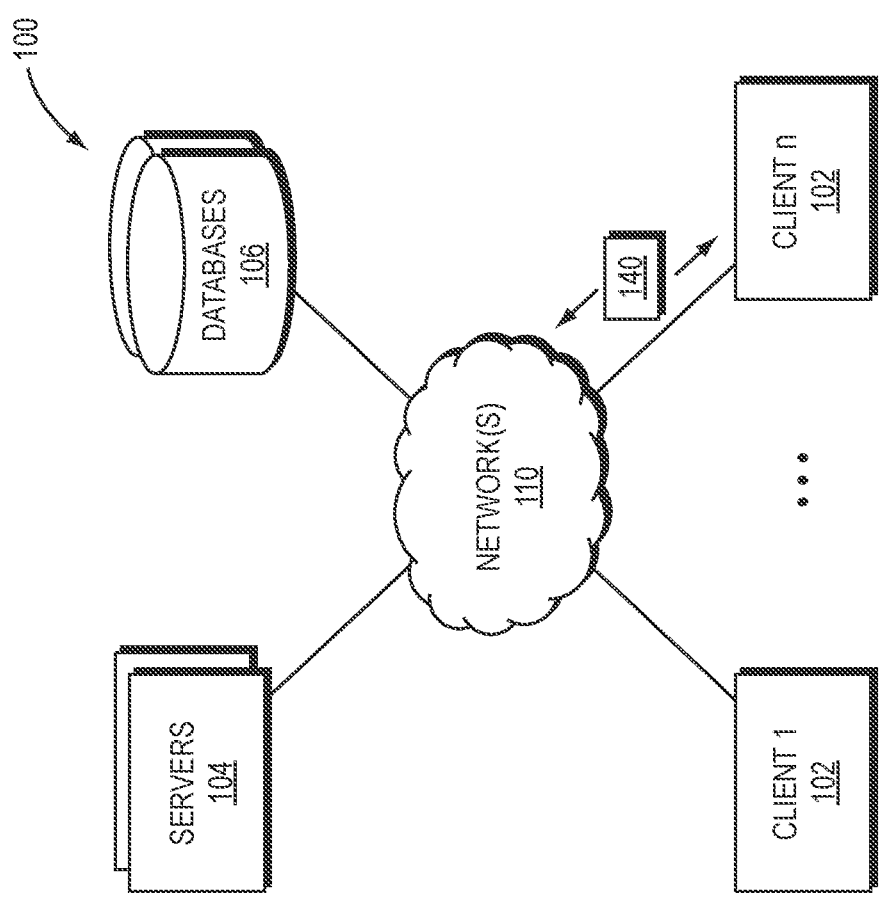
FIG. 1 illustrates an example computer network.

FIG. 1 is a schematic block diagram of an example simplified computing system 100 illustratively comprising any number of client devices 102 (e.g., a first through nth client device), one or more servers 104, and one or more databases 106, where the devices may be in communication with one another via any number of networks 110. The one or more networks 110 may include, as would be appreciated, any number of specialized networking devices such as routers, switches, access points, etc., interconnected via wired and/or wireless connections. For example, devices 102-104 and/or the intermediary devices in network(s) 110 may communicate wirelessly via links based on WiFi, cellular, infrared, radio, near-field communication, satellite, or the like. Other such connections may use hardwired links, e.g., Ethernet, fiber optic, etc. The nodes/devices typically communicate over the network by exchanging discrete frames or packets of data (packets 140) according to predefined protocols, such as the Transmission Control Protocol/Internet Protocol (TCP/IP) other suitable data structures, protocols, and/or signals. In this context, a protocol consists of a set of rules defining how the nodes interact with each other.

Client devices 102 may include any number of user devices or end point devices configured to interface with the techniques herein. For example, client devices 102 may include, but are not limited to, desktop computers, laptop computers, tablet devices, smart phones, wearable devices (e.g., heads up devices, smart watches, etc.), set-top devices, smart televisions, Internet of Things (IoT) devices, autonomous devices, or any other form of computing device capable of participating with other devices via network(s) 110.

Notably, in some embodiments, servers 104 and/or databases 106, including any number of other suitable devices (e.g., firewalls, gateways, and so on) may be part of a cloud-based service. In such cases, the servers and/or databases 106 may represent the cloud-based device(s) that provide certain services described herein, and may be distributed, localized (e.g., on the premise of an enterprise, or "on prem"), or any combination of suitable configurations, as will be understood in the art.

Those skilled in the art will also understand that any number of nodes, devices, links, etc. may be used in computing system 100, and that the view shown herein is for simplicity. Also, those skilled in the art will further understand that while the network is shown in a certain orientation, the system 100 is merely an example illustration that is not meant to limit the disclosure.

Notably, web services can be used to provide communications between electronic and/or computing devices over a network, such as the Internet. A web site is an example of a type of web service. A web site is typically a set of related web pages that can be served from a web domain. A web site can be hosted on a web server. A publicly accessible web site can generally be accessed via a network, such as the Internet. The publicly accessible collection of web sites is generally referred to as the World Wide Web (WWW).

Also, cloud computing generally refers to the use of computing resources (e.g., hardware and software) that are delivered as a service over a network (e.g., typically, the Internet). Cloud computing includes using remote services to provide a user's data, software, and computation.

Moreover, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a Software as a Service (SaaS) over a network, such as the Internet.

Figure 2:
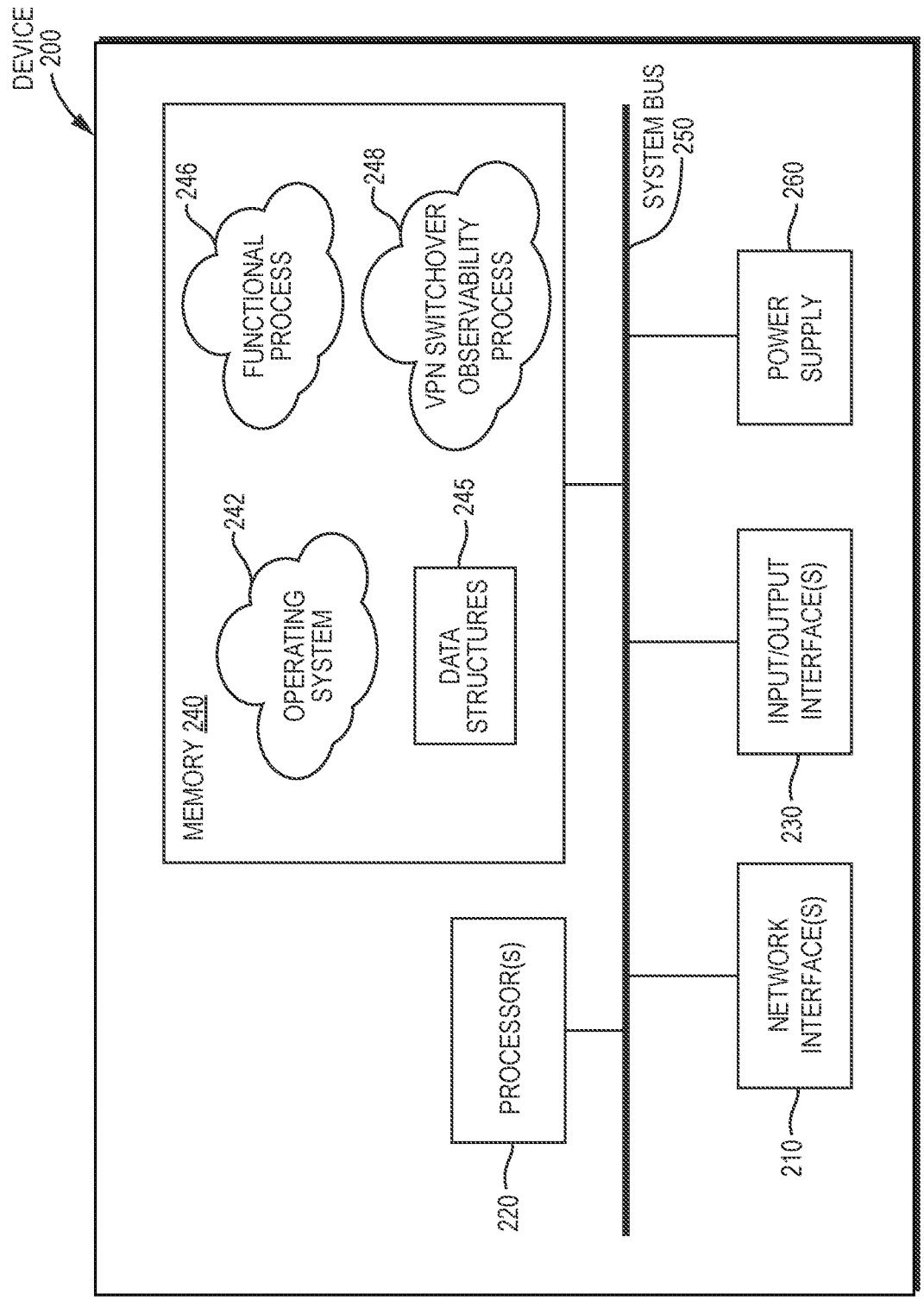
FIG. 2 illustrates an example computing device/node.

FIG. 2 is a schematic block diagram of an example node/device 200 that may be used with one or more embodiments described herein, e.g., as any of the devices 102-106 shown in FIG. 1 above. Device 200 may comprise one or more network interfaces 210 (e.g., wired, wireless, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network(s) 110. The network interfaces may be configured to transmit and/or receive data using a variety of different communication protocols. Note, further, that device 200 may have multiple types of network connections via interfaces 210, e.g., wireless and wired/physical connections, and that the view herein is merely for illustration.

Depending on the type of device, other interfaces, such as input/output (I/O) interfaces 230, user interfaces (UIs), and so on, may also be present on the device. Input devices, in particular, may include an alpha-numeric keypad (e.g., a keyboard) for inputting alpha-numeric and other information, a pointing device (e.g., a mouse, a trackball, stylus, or cursor direction keys), a touchscreen, a microphone, a camera, and so on. Additionally, output devices may include speakers, printers, particular network interfaces, monitors, etc.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise a one or more functional processes 246, and on certain devices, an illustrative "VPN switchover observability" process 248, as described herein. Notably, functional processes 246, when executed by processor(s) 220, cause each particular device 200 to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

—Observability Intelligence Platform—

As noted above, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a software as a service (SaaS) over a network, such as the Internet. As an example, a distributed application can be implemented as a SaaS-based web service available via a web site that can be accessed via the Internet. As another example, a distributed application can be implemented using a cloud provider to deliver a cloud-based service.

Users typically access cloud-based/web-based services (e.g., distributed applications accessible via the Internet) through a web browser, a light-weight desktop, and/or a mobile application (e.g., mobile app) while the enterprise software and user's data are typically stored on servers at a remote location. For example, using cloud-based/web-based services can allow enterprises to get their applications up and running faster, with improved manageability and less maintenance, and can enable enterprise IT to more rapidly adjust resources to meet fluctuating and unpredictable business demand. Thus, using cloud-based/web-based services can allow a business to reduce Information Technology (IT) operational costs by outsourcing hardware and software maintenance and support to the cloud provider.

However, a significant drawback of cloud-based/web-based services (e.g., distributed applications and SaaS-based solutions available as web services via web sites and/or using other cloud-based implementations of distributed applications) is that troubleshooting performance problems can be very challenging and time consuming. For example, determining whether performance problems are the result of the cloud-based/web-based service provider, the customer's own internal IT network (e.g., the customer's enterprise IT network), a user's client device, and/or intermediate network providers between the user's client device/internal IT network and the cloud-based/web-based service provider of a distributed application and/or web site (e.g., in the Internet) can present significant technical challenges for detection of such networking related performance problems and determining the locations and/or root causes of such networking related performance problems. Additionally, determining whether performance problems are caused by the network or an application itself, or portions of an application, or particular services associated with an application, and so on, further complicate the troubleshooting efforts.

Certain aspects of one or more embodiments herein may thus be based on (or otherwise relate to or utilize) an observability intelligence platform for network and/or application performance management. For instance, solutions are available that allow customers to monitor networks and applications, whether the customers control such networks and applications, or merely use them, where visibility into such resources may generally be based on a suite of "agents" or pieces of software that are installed in different locations in different networks (e.g., around the world).

Specifically, as discussed with respect to illustrative FIG. 3 below, performance within any networking environment may be monitored, specifically by monitoring applications and entities (e.g., transactions, tiers, nodes, and machines) in the networking environment using agents installed at individual machines at the entities. As an example, applications may be configured to run on one or more machines (e.g., a customer will typically run one or more nodes on a machine, where an application consists of one or more tiers, and a tier consists of one or more nodes). The agents collect data associated with the applications of interest and associated nodes and machines where the applications are being operated. Examples of the collected data may include performance data (e.g., metrics, metadata, etc.) and topology data (e.g., indicating relationship information), among other configured information. The agent-collected data may then be provided to one or more servers or controllers to analyze the data.

Examples of different agents (in terms of location) may comprise cloud agents (e.g., deployed and maintained by the observability intelligence platform provider), enterprise agents (e.g., installed and operated in a customer's network), and endpoint agents, which may be a different version of the previous agents that is installed on actual users' (e.g., employees') devices (e.g., on their web browsers or otherwise). Other agents may specifically be based on categorical configurations of different agent operations, such as language agents (e.g., Java agents, .Net agents, PHP agents, and others), machine agents (e.g., infrastructure agents residing on the host and collecting information regarding the machine which implements the host such as processor usage, memory usage, and other hardware information), and network agents (e.g., to capture network information, such as data collected from a socket, etc.).

Each of the agents may then instrument (e.g., passively monitor activities) and/or run tests (e.g., actively create events to monitor) from their respective devices, allowing a customer to customize from a suite of tests against different networks and applications or any resource that they're interested in having visibility into, whether it's visibility into that end point resource or anything in between, e.g., how a device is specifically connected through a network to an end resource (e.g., full visibility at various layers), how a website is loading, how an application is performing, how a particular business transaction (or a particular type of business transaction) is being effected, and so on, whether for individual devices, a category of devices (e.g., type, location, capabilities, etc.), or any other suitable embodiment of categorical classification.

Figure 3:
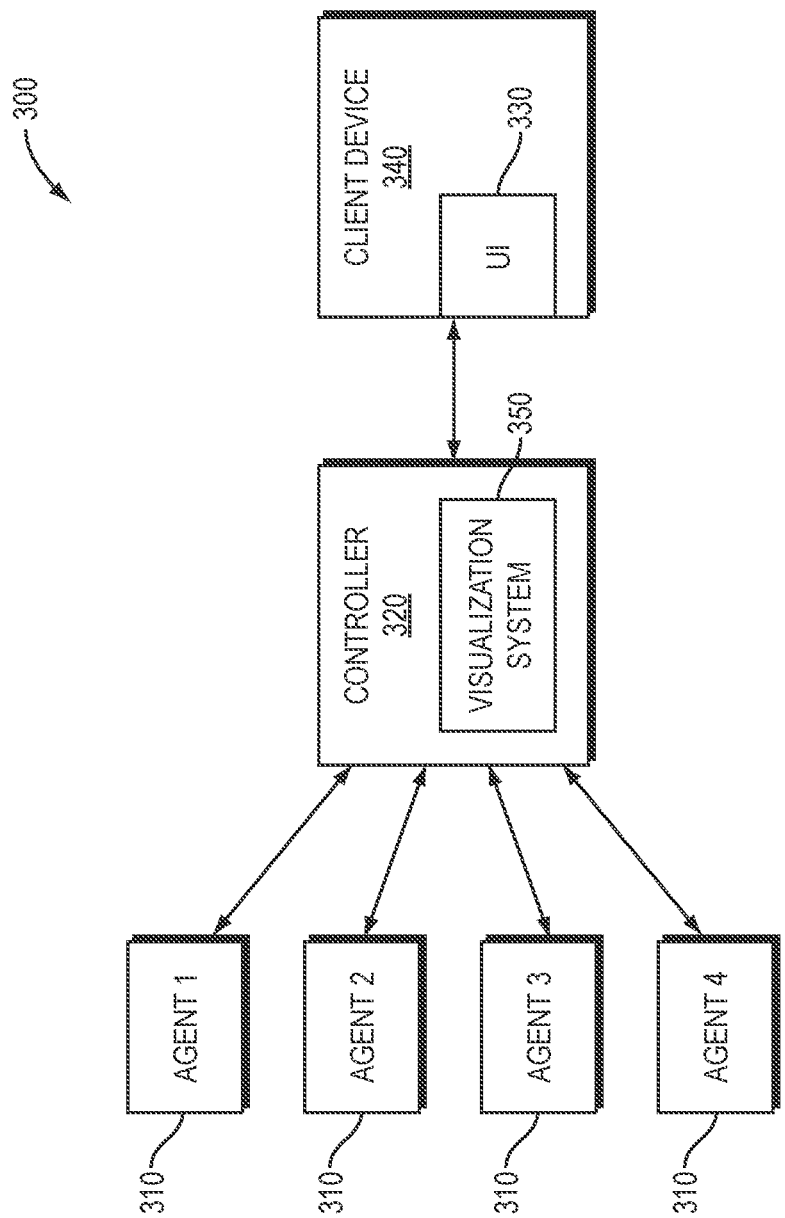
FIG. 3 illustrates an example observability intelligence platform.

FIG. 3 is a block diagram of an example observability intelligence platform 300 that can implement one or more aspects of the techniques herein. The observability intelligence platform is a system that monitors and collects metrics of performance data for a network and/or application environment being monitored. At the simplest structure, the observability intelligence platform includes one or more agents 310 and one or more servers/controllers 320. Agents may be installed on network browsers, devices, servers, etc., and may be executed to monitor the associated device and/or application, the operating system of a client, and any other application, API, or another component of the associated device and/or application, and to communicate with (e.g., report data and/or metrics to) the controller(s) 320 as directed. Note that while FIG. 3 shows four agents (e.g., Agent 1 through Agent 4) communicatively linked to a single controller, the total number of agents and controllers can vary based on a number of factors including the number of networks and/or applications monitored, how distributed the network and/or application environment is, the level of monitoring desired, the type of monitoring desired, the level of user experience desired, and so on.

For example, instrumenting an application with agents may allow a controller to monitor performance of the application to determine such things as device metrics (e.g., type, configuration, resource utilization, etc.), network browser navigation timing metrics, browser cookies, application calls and associated pathways and delays, other aspects of code execution, etc. Moreover, if a customer uses agents to run tests, probe packets may be configured to be sent from agents to travel through the Internet, go through many different networks, and so on, such that the monitoring solution gathers all of the associated data (e.g., from returned packets, responses, and so on, or, particularly, a lack thereof). Illustratively, different "active" tests may comprise HTTP tests (e.g., using curl to connect to a server and load the main document served at the target), Page Load tests (e.g., using a browser to load a full page—i.e., the main document along with all other components that are included in the page), or Transaction tests (e.g., same as a Page Load, but also performing multiple tasks/steps within the page—e.g., load a shopping website, log in, search for an item, add it to the shopping cart, etc.).

The controller 320 is the central processing and administration server for the observability intelligence platform. The controller 320 may serve a browser-based user interface (UI) 330 that is the primary interface for monitoring, analyzing, and troubleshooting the monitored environment. Specifically, the controller 320 can receive data from agents 310 (and/or other coordinator devices), associate portions of data (e.g., topology, business transaction end-to-end paths and/or metrics, etc.), communicate with agents to configure collection of the data (e.g., the instrumentation/tests to execute), and provide performance data and reporting through the interface 330. The interface 330 may be viewed as a web-based interface viewable by a client device 340. In some implementations, a client device 340 can directly communicate with controller 320 to view an interface for monitoring data. The controller 320 can include a visualization system 350 for displaying the reports and dashboards related to the disclosed technology. In some implementations, the visualization system 350 can be implemented in a separate machine (e.g., a server) different from the one hosting the controller 320.

Notably, in an illustrative Software as a Service (SaaS) implementation, a controller instance 320 may be hosted remotely by a provider of the observability intelligence platform 300. In an illustrative on-premises (On-Prem) implementation, a controller instance 320 may be installed locally and self-administered.

The controllers 320 receive data from different agents 310 (e.g., Agents 1-4) deployed to monitor networks, applications, databases and database servers, servers, and end user clients for the monitored environment. Any of the agents 310 can be implemented as different types of agents with specific monitoring duties. For example, application agents may be installed on each server that hosts applications to be monitored. Instrumenting an agent adds an application agent into the runtime process of the application.

Database agents, for example, may be software (e.g., a Java program) installed on a machine that has network access to the monitored databases and the controller. Standalone machine agents, on the other hand, may be standalone programs (e.g., standalone Java programs) that collect hardware-related performance statistics from the servers (or other suitable devices) in the monitored environment. The standalone machine agents can be deployed on machines that host application servers, database servers, messaging servers, Web servers, etc. Furthermore, end user monitoring (EUM) may be performed using browser agents and mobile agents to provide performance information from the point of view of the client, such as a web browser or a mobile native application. Through EUM, web use, mobile use, or combinations thereof (e.g., by real users or synthetic agents) can be monitored based on the monitoring needs.

Note that monitoring through browser agents and mobile agents are generally unlike monitoring through application agents, database agents, and standalone machine agents that are on the server. In particular, browser agents may generally be embodied as small files using web-based technologies, such as JavaScript agents injected into each instrumented web page (e.g., as close to the top as possible) as the web page is served, and are configured to collect data. Once the web page has completed loading, the collected data may be bundled into a beacon and sent to an EUM process/cloud for processing and made ready for retrieval by the controller. Browser real user monitoring (Browser RUM) provides insights into the performance of a web application from the point of view of a real or synthetic end user. For example, Browser RUM can determine how specific Ajax or iframe calls are slowing down page load time and how server performance impact end user experience in aggregate or in individual cases. A mobile agent, on the other hand, may be a small piece of highly performant code that gets added to the source of the mobile application. Mobile RUM provides information on the native mobile application (e.g., iOS or Android applications) as the end users actually use the mobile application. Mobile RUM provides visibility into the functioning of the mobile application itself and the mobile application's interaction with the network used and any server-side applications with which the mobile application communicates.

Note further that in certain embodiments, in the application intelligence model, a business transaction represents a particular service provided by the monitored environment. For example, in an e-commerce application, particular real-world services can include a user logging in, searching for items, or adding items to the cart. In a content portal, particular real-world services can include user requests for content such as sports, business, or entertainment news. In a stock trading application, particular real-world services can include operations such as receiving a stock quote, buying, or selling stocks.

A business transaction, in particular, is a representation of the particular service provided by the monitored environment that provides a view on performance data in the context of the various tiers that participate in processing a particular request. That is, a business transaction, which may be identified by a unique business transaction identification (ID), represents the end-to-end processing path used to fulfill a service request in the monitored environment (e.g., adding items to a shopping cart, storing information in a database, purchasing an item online, etc.). Thus, a business transaction is a type of user-initiated action in the monitored environment defined by an entry point and a processing path across application servers, databases, and potentially many other infrastructure components. Each instance of a business transaction is an execution of that transaction in response to a particular user request (e.g., a socket call, illustratively associated with the TCP layer). A business transaction can be created by detecting incoming requests at an entry point and tracking the activity associated with request at the originating tier and across distributed components in the application environment (e.g., associating the business transaction with a 4-tuple of a source IP address, source port, destination IP address, and destination port). A flow map can be generated for a business transaction that shows the touch points for the business transaction in the application environment. In one embodiment, a specific tag may be added to packets by application specific agents for identifying business transactions (e.g., a custom header field attached to a hypertext transfer protocol (HTTP) payload by an application agent, or by a network agent when an application makes a remote socket call), such that packets can be examined by network agents to identify the business transaction identifier (ID) (e.g., a Globally Unique Identifier (GUID) or Universally Unique Identifier (UUID)). Performance monitoring can be oriented by business transaction to focus on the performance of the services in the application environment from the perspective of end users. Performance monitoring based on business transactions can provide information on whether a service is available (e.g., users can log in, check out, or view their data), response times for users, and the cause of problems when the problems occur.

In accordance with certain embodiments, the observability intelligence platform may use both self-learned baselines and configurable thresholds to help identify network and/or application issues. A complex distributed application, for example, has a large number of performance metrics and each metric is important in one or more contexts. In such environments, it is difficult to determine the values or ranges that are normal for a particular metric; set meaningful thresholds on which to base and receive relevant alerts; and determine what is a "normal" metric when the application or infrastructure undergoes change. For these reasons, the disclosed observability intelligence platform can perform anomaly detection based on dynamic baselines or thresholds, such as through various machine learning techniques, as may be appreciated by those skilled in the art. For example, the illustrative observability intelligence platform herein may automatically calculate dynamic baselines for the monitored metrics, defining what is "normal" for each metric based on actual usage. The observability intelligence platform may then use these baselines to identify subsequent metrics whose values fall out of this normal range.

In general, data/metrics collected relate to the topology and/or overall performance of the network and/or application (or business transaction) or associated infrastructure, such as, e.g., load, average response time, error rate, percentage CPU busy, percentage of memory used, etc. The controller UI can thus be used to view all of the data/metrics that the agents report to the controller, as topologies, heatmaps, graphs, lists, and so on. Illustratively, data/metrics can be accessed programmatically using a Representational State Transfer (REST) API (e.g., that returns either the JavaScript Object Notation (JSON) or the eXtensible Markup Language (XML) format). Also, the REST API can be used to query and manipulate the overall observability environment.

Those skilled in the art will appreciate that other configurations of observability intelligence may be used in accordance with certain aspects of the techniques herein, and that other types of agents, instrumentations, tests, controllers, and so on may be used to collect data and/or metrics of the network(s) and/or application(s) herein. Also, while the description illustrates certain configurations, communication links, network devices, and so on, it is expressly contemplated that various processes may be embodied across multiple devices, on different devices, utilizing additional devices, and so on, and the views shown herein are merely simplified examples that are not meant to be limiting to the scope of the present disclosure.

—Coordinated Observability for Dynamic VPN Switchover—

As noted above, virtual private network (VPN) usage has reached unprecedented height during recent times, and this trend adds more challenges on information technology (IT) departments to timely identify and isolate the issues reported by the users. These challenges are particularly exacerbated due to the use of distributed VPN gateways, and the general lack of observability into VPN gateway behavior, especially as users move from one VPN gateway to another.

In particular, VPNs are the de facto method to access critical enterprise resources remotely. The typical method to implement VPN access is by deploying multiple entry points in various regions with VPN gateways to cater to the need of the local population. A VPN client (on an endpoint device) conventionally initiates their VPN connection based on a configured profile that has details about the available VPN gateways in order of preference. When a first choice gateway is not responding, the VPN client falls back to the next-in-line gateway. However, there may be cases where a VPN connection is not denied, but the overall performance over a specific connection remains slow. This could be due to various factors including (but not limited to):

Service provider network congestion—For example, it could be localized when many corporate users are concentrated in a specific region and thousands of employees in that region try to access common services like VPN;

Temporary Issues with the Service provider;

Issues with the corporate access network or VPN gateways;

And so on.

It is very difficult for an endpoint device to identify the exact root cause and choose the right/better VPN gateway, particularly as the cause of service disruption could be at different points. For instance, although endpoint observability agents have the capability to check the application latency in the VPN connection (e.g., due to misconfiguration of gateways and latency in network points), which does give visibility on the slowness witnessed, this information itself is insufficient for the user to decide on an alternate VPN gateway without the clear visibility of the load status of alternate gateways. Endpoints that simply fall back to other gateways during slow connections may result in degradation in performance of other gateways. For example, there could be a temporary issue in the network which the endpoint agent can't identify in an isolated manner, and also false alarms in diagnosing the issue can be a possibility at endpoint level. As such, the techniques herein, as described in greater detail below, provide an intelligent mechanism that will allow coordinated telemetry collection at different points and to perform the analysis with holistic consideration to provide intelligence to VPN clients to recommend the appropriate gateway.

While running observability agents on an endpoint (e.g., a laptop or other mobile device) and on the cloud (e.g., enterprise agents) offer certain insights to the problem above, there are different associated challenges that remain unaddressed, particularly depending on the scenario. Examples of such challenges are presented in the network environments shown in FIGS. 4A-4B below.

Figure 4A:
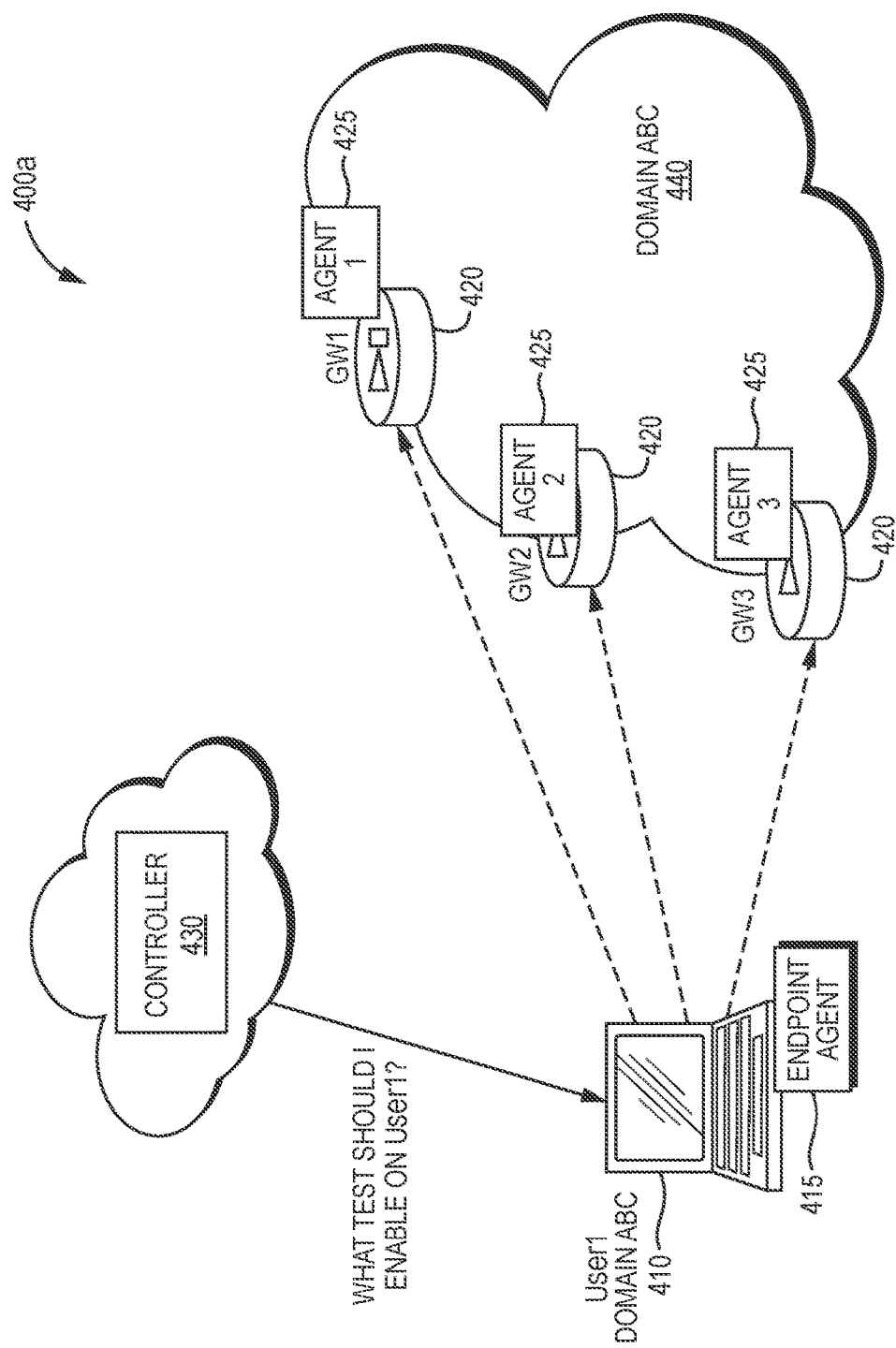
FIGS. 4A-4B illustrate example environments of virtual private network (VPN) connections to gateways in various domain scenarios.

First, in the example environment 400a of FIG. 4A, end user 410 "User1" belongs to the same admin domain 440 "ABC" as the optional VPN gateways 420 ("GW1", "GW2", and "GW3") and so it is fair to assume that the endpoint agent 415 (running on the end user machine) and the enterprise agents 425 (running on/around the gateway, namely "Agent1", "Agent2", and "Agent3" as shown) belong to the same enterprise (and thus have the same account token). Unlike SaaS applications, the end user can be roaming to different locations, and depending on the current location, the corresponding VPN gateway will be selected by the user. As such, the relevant testcases should be enabled on the endpoint agent, as would conventionally be directed by a cloud observability controller 430. However, it is not a scalable approach to enable testcases from the endpoint agent to all the possible VPN gateways. The techniques herein, therefore, present a dynamic mechanism where the end user signals the current gateway to which the VPN session is established and based on the same, the cloud controller can push the relevant test cases to the endpoint agent 415 and the enterprise agents 425, accordingly (e.g., in uni/bi-directional fashion, as described below).

Figure 4B:
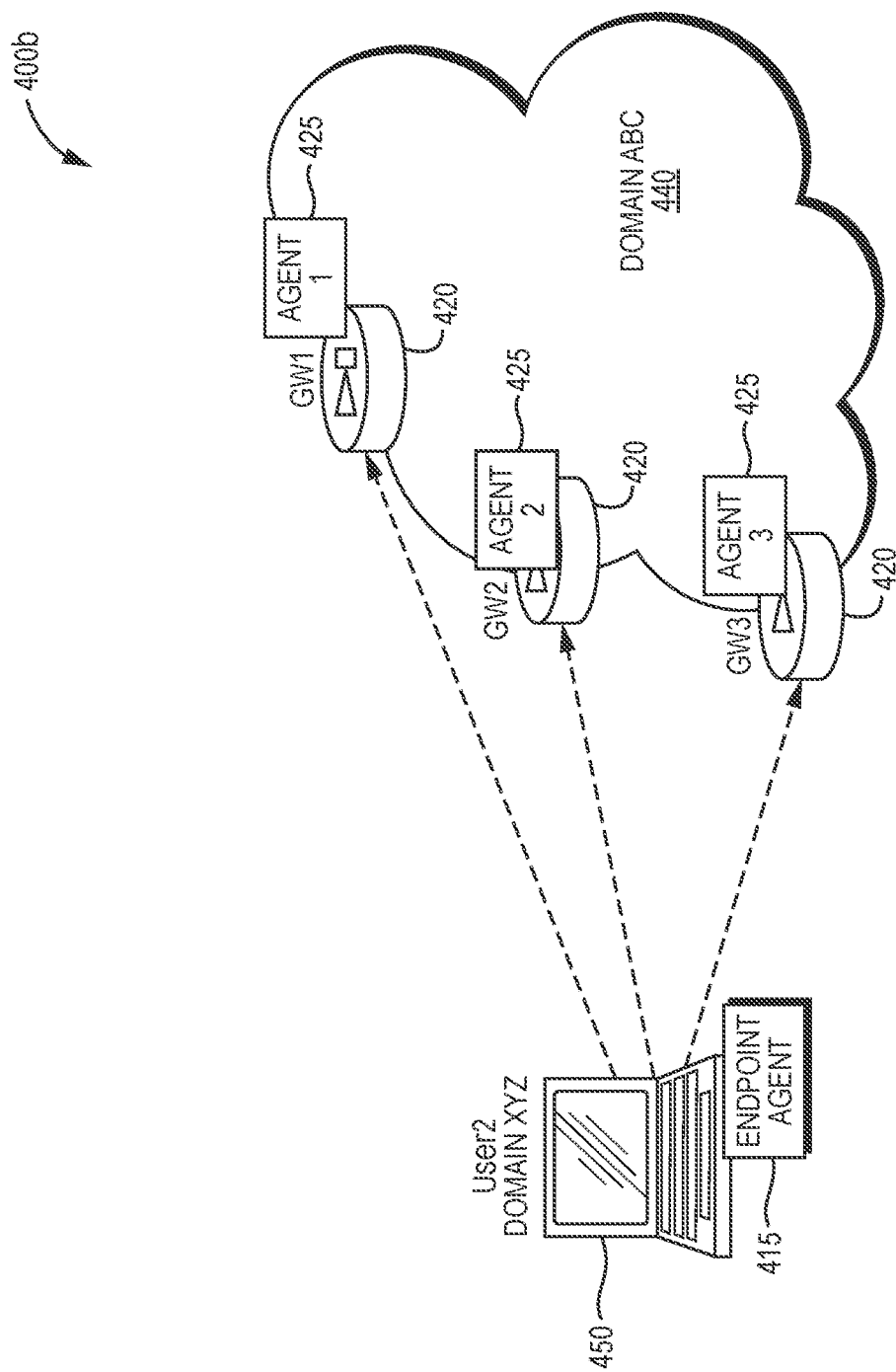

Example environment 400b of FIG. 4B is another very common scenario where an end-user 450 "User2" (with an endpoint agent 415) is establishing VPN session to a gateway that does not necessarily belong to the same administrative domain (Partners, VPN as a Service or "VPNaaS", guest domains, etc.). In this scenario, User2 belonging to domain "XYZ" may establish a VPN session to a gateway belonging to domain "ABC". A typical observability intelligence platform, such as that described above, works by defining the test cases in a portal where all the agents are listed and these agents are identified based on a token used to instantiate the agent (i.e., different token-based instantiations cannot view each other). In such scenarios, there are challenges for the end-user (and the VPN gateway) to identify if the remote participant supports observability agents, and if so, what are the testcases supported, and moreover, how to bring cross-domain performance/liveliness visibility to the portal/controller for intelligent alerts and/or guided remediation.

The techniques herein, therefore, address the challenges related to the scenarios above, based on the ability of an endpoint to switch VPN gateways which may or may not be in the same domain. In particular, the embodiments herein ensure that an endpoint agent running on the end user runs only relevant test cases, while also coordinating requests for monitoring to VPN gateways of different domains, negotiating the testcases, and sharing performance metrics between the client and the gateway of different domains, and then taking any necessary actions based thereon.

Specifically, the techniques herein provide for coordinated observability for dynamic VPN switchover, where control-plane-based monitoring negotiation (agent availability, test cases, cadence, permissions, etc.) is used between the endpoint client and the VPN gateway, particularly where a relevant (one-time) token exchange can be used to register, offload testing, and cross-pollinate the testing metric visibility across different domains for intelligent actions (such as performing VPN gateway selection, toggling the session, etc.).

Operationally, the techniques herein may broadly be based generally on an end user device establishing a VPN connection with a particular VPN gateway, where depending on whether the end user device and the particular VPN gateway are in the same domain, a request for monitoring through the particular VPN gateway may be handled appropriately such that control-plane-based negotiations result in the end user agent receiving test specifics to execute, where the correlation of the associated VPN gateways metrics and the end user agent metrics may be coordinated, accordingly.

Figure 5:
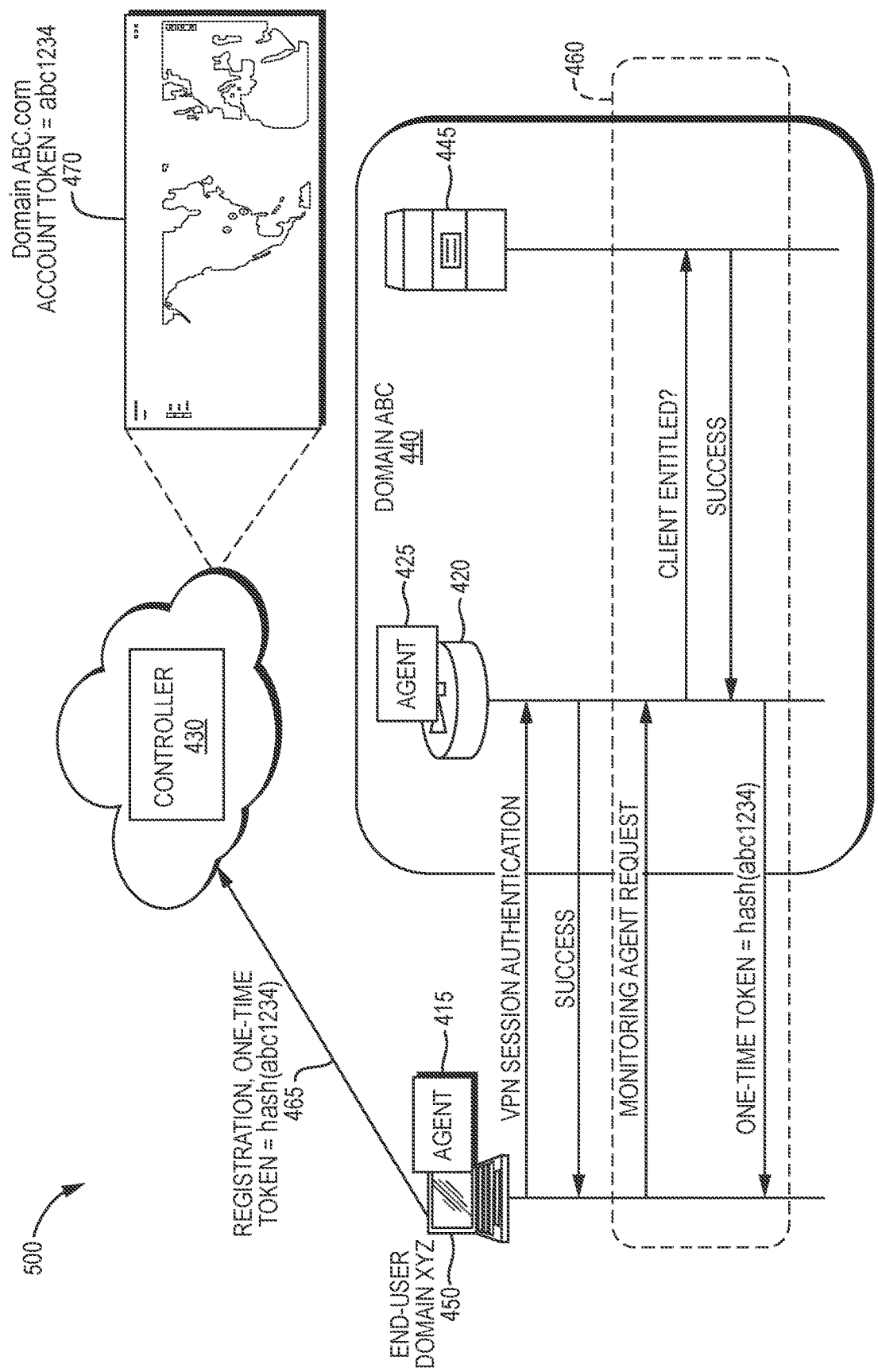
FIG. 5 illustrates an example of control plane negotiation and dynamic agent registration, particularly when a VPN client belongs to a different domain than a VPN gateway.
Figure 6:
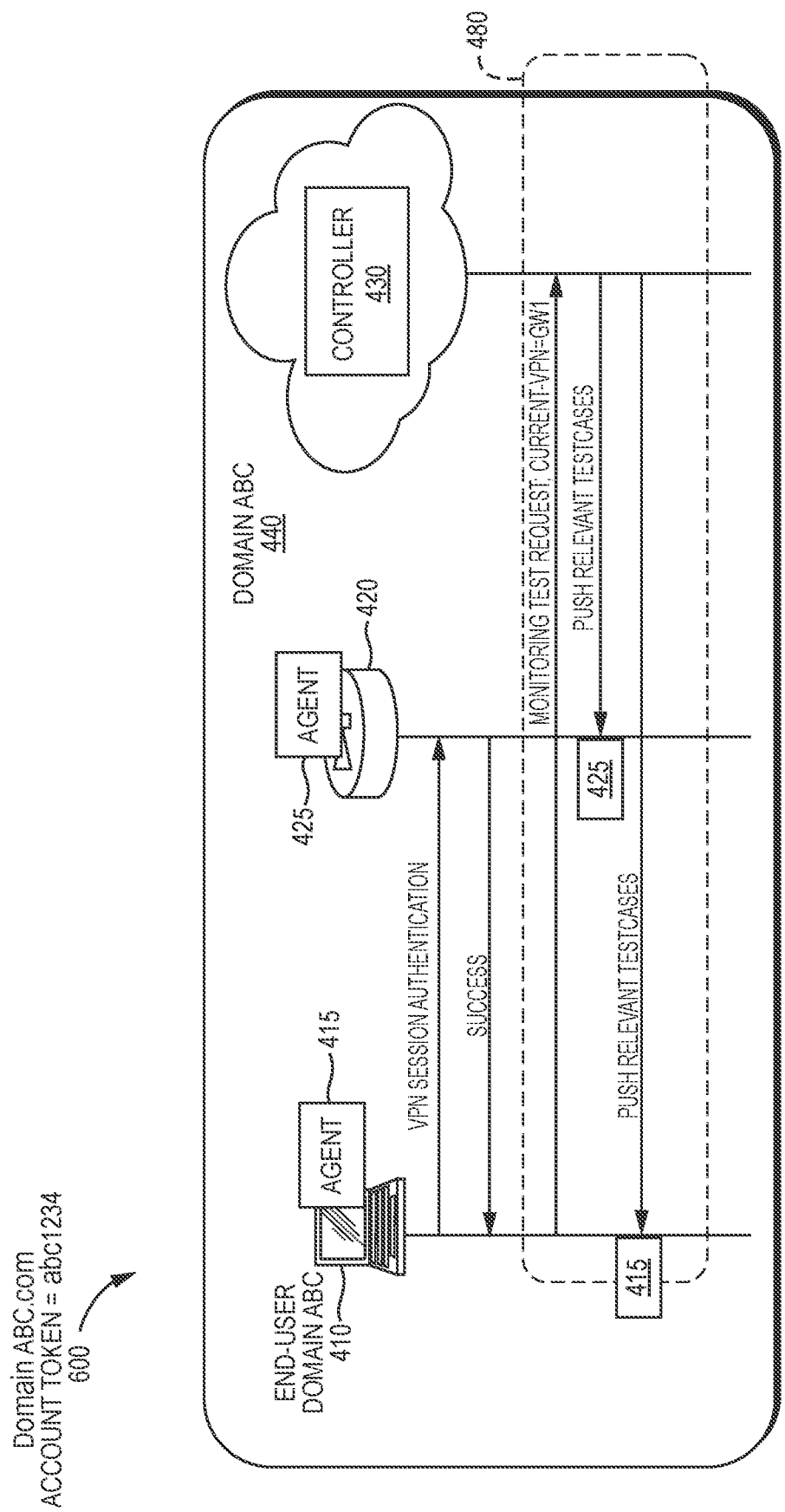
FIG. 6 illustrates an example control plane negotiation and testcase establishment, particularly when a VPN client and a VPN gateway belong to a same domain.

In particular, FIGS. 5-6 illustrate the concepts of the techniques herein based on the two different possible scenarios mentioned above, i.e., where the end point device and VPN gateway are in different domains (FIG. 4B above) or the same domain (FIG. 4A above). Namely, as shown in FIG. 5, when there are different domains, the monitoring agent on the endpoint device has "Visibility Only", meaning there is no central controller, and so the metrics are used only for visibility purposes. Conversely, as shown in FIG. 6, when the domain is the same, then the monitoring agent on the endpoint device can have a "Guided Remedy" solution, where a central cloud controller (e.g., a "VPN Performance and Guidance" controller) can continuously monitor and take the action to steer the VPN session to other performing gateways.

First, with reference to example 500 of FIG. 5, a system for control plane negotiation and dynamic agent registration is shown. Specifically, when the client (user device 450) belongs to a different domain (e.g., as in the example 400b in FIG. 4B above), the control plane used to establish the VPN session between the user device and a selected VPN gateway 420 is used to negotiate additional details that can be used to register the endpoint agent 415 and get the domain specific test cases pushed for monitoring from the controller 430.

As shown in FIG. 5, after the VPN session is established with the VPN gateway 420, the client (end-user device 450) sends a request for monitoring agent details in message exchange 460. (Note that any suitable VPN protocol may be applied and/or extended for this exchange, such as Internet Key Exchange (IKE), Layer-2 Tunneling Protocol (L2TP), Point-to-Point Tunneling Protocol (PPTP), OpenVPN, etc.). In one embodiment, the negotiation (exchange 460) happens after the underlying VPN session is established, while in another embodiment, the negotiation can be embedded within the original authentication exchange. In either of the cases, as shown in the exchange 460, the gateway, upon receiving the request, verifies the entitlement for the user with the local server 445 of domain 440. Upon successful verification, the VPN gateway receives a one-time token that will be shared with the client (e.g., "hash(abc1234)").

The endpoint agent 415 running on the client (device 450) may then use the one-time token to register with the Cloud agent (e.g., on controller 430), such as through a different exchange 465. The endpoint agent may also include a plurality of other details (such as identifying the VPN gateway who shared the token, and so on). The cloud intelligence (controller 430) may then use the one-time token to identify the domain of the VPN gateway, and correspondingly register the client. Note that different tokens may be used to differentiate the type of monitoring services that were approved by the domain 440 (e.g., routing tests versus performance tests, etc.). Based on the service entitled for the token, the controller may then identify the test cases to be pushed to the endpoint agent 415. Note that the controller 430 may additionally use the current VPN gateway details to identify the remote agents (e.g., enterprise agents 425 on/around/close to the particular VPN gateway), and enable the relevant testing there, as well.

Note that in scenarios without a controller located within the domain 440 (e.g., a VPN Performance and Guidance controller mentioned above), the metrics obtained through the endpoint agent's tests may be only for visibility purposes (e.g., a graphical user interface 470 or other administrative display/presentation of information). In this situation, any VPN-related issues will be accounted, and the relevant domain administrators will thus have the visibility of the VPN session performance, accordingly.

According to one or more embodiments herein, FIG. 6 illustrates another example 600 of the techniques herein, particularly for control plane negotiation and testcase establishment where the client device and the VPN gateway belong to the same domain (e.g., ABC, as in example 400a of FIG. 4A above). Here, when the negotiation is successful and the VPN session is established, the client device (end user device) 410 informs the cloud controller 430 (e.g., a VPN Performance and Guidance controller) about the current VPN gateway (e.g., "GW1") through exchange 480. Alternatively, the VPN profile used to create the session can be exchanged. Note that the controller 430 may be a central controller with full visibility and control, or may consult a cloud controller with higher-level visibility to obtain the relevant enterprise agent details for different VPN gateways (e.g., primary versus backup gateways, and so on). That is, in the embodiment shown, the controller 430 manages this information, while in another embodiment, the controller 430 may be more specialized (e.g., used for test coordination and VPN gateway selection for a particular domain, but in communication with a centralized observability controller overseeing multiple domains).

The controller 430 (e.g., independently as a domain-based controller, or else in coordination with a cloud-based server/controller) will request the that the relevant testcases be enabled from the endpoint agent 415 (on the client device 410) to the enterprise agents 425 on the VPN gateways 420. The controller 430 may then continue to monitor the performance of different testcases and upon detecting a failure/degradation, takes the necessary course of action (e.g., a reestablishment of the VPN session through another gateway that is not degraded/failed, further tests, simple alerts, and so on).

The metrics collected as part of these testcases can be just routing metrics or can be more granular metrics (e.g., on per application basis, etc.). The metrics may be collected by the agents in coordination with broader application performance monitoring applications such as the observability intelligence platform above (for applications). According to the techniques herein, the metrics may be processed by the controller 430 in a holistic manner, and recommendations on VPN gateway switchover may then occur based thereon, accordingly (e.g., best performance, highest bandwidth/availability, lowest latency, and so on).

Note that the solution herein may leverage traditional observability intelligence platform metrics with additional metrics specific for the VPN use cases herein. For example, by using the observability agents in all critical vantage points as described above, such as endpoint agents (e.g., in the user's device), cloud agents (e.g., in the service provider network), and enterprise agents (e.g., in the data center of the VPN gateway), new types of metrics are made available herein, for the decisions made above or for general display or further analysis (or inputs into various algorithms, such as for anomaly detection, performance improvements, and so on). For instance, the following illustrative metrics can now be collected at VPN gateways:

Load profile of VPN gateway cluster (e.g., statistics from a VPN gateway load balancer which captures the load of each member in the cluster and the projection of how many new connections the cluster can handle, etc.);

Active sessions meta information, such as with knowledge of whether sessions through the gateway are accessed for business-critical applications versus non-business-critical applications (e.g., on a user account basis);

Fail over status (e.g., a current high-availability (HA) status→Active/Active or Active/Backup and the current status);

Gateway latency statistics (e.g., considering performance of the gateway application);

Gateway underlay resource health information;

Etc.

In addition, metrics collected at a cloud agent in the service provider network, according to the embodiments herein, may now comprise such things as:

Latency of various VPN gateways in a given region's point of view (e.g., density of users connecting from a location);

Latency of various VPN gateways based on different service provide connection viewpoints (e.g., identifying which service provider connection is having latency issues);

Congestion state;

Border Gateway Protocol (BGP) path metrics;

VPN gateway load on the service provider;

And so on.

Furthermore, metrics that may be collected at endpoint agent may comprise application latency (e.g., detecting latency-based anomalies) and other application-centric metrics, accordingly.

Figure 7:
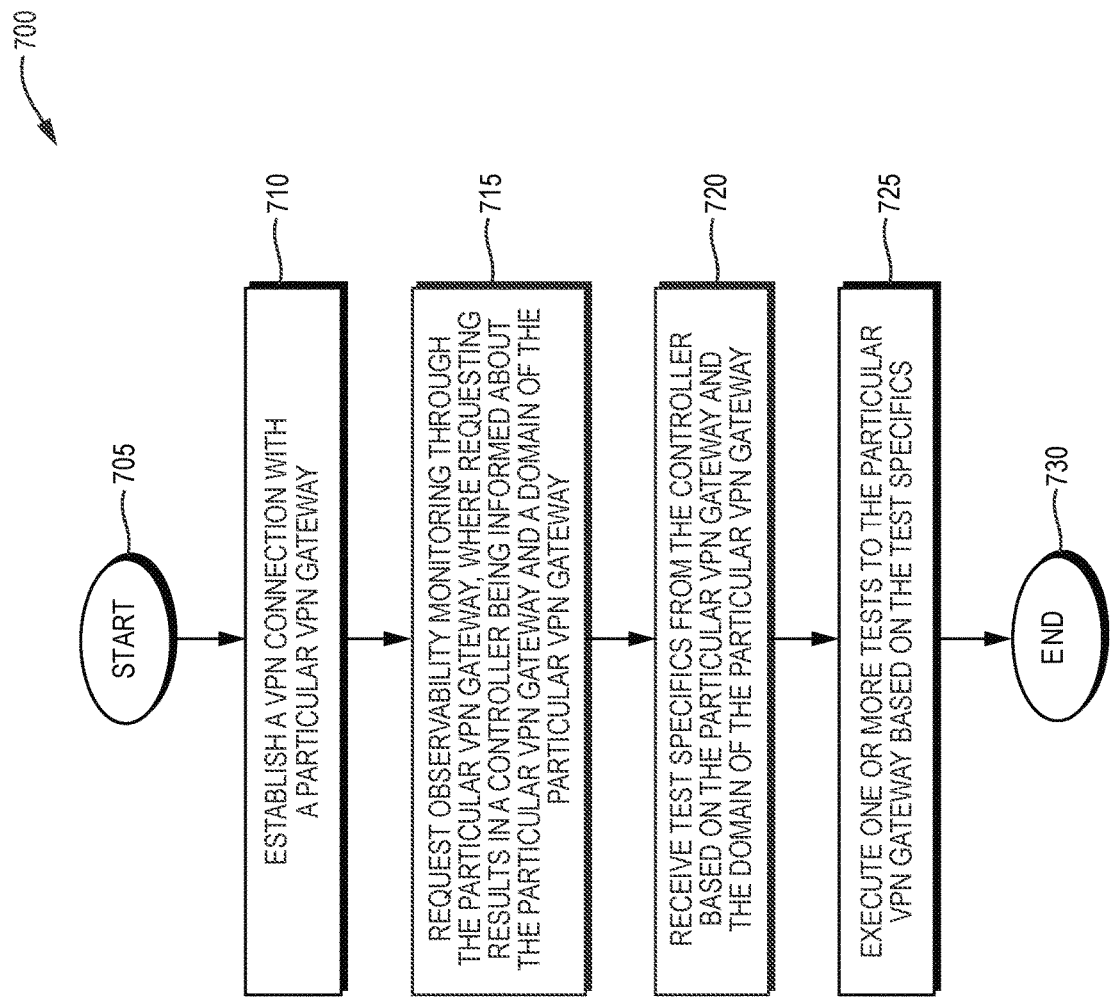
FIG. 7 illustrates an example simplified procedure for coordinated observability for dynamic VPN switchover in accordance with one or more embodiments described herein, particularly from the perspective of an endpoint device/agent.

In closing, FIG. 7 illustrates an example simplified procedure for coordinated observability for dynamic VPN switchover in accordance with one or more embodiments described herein, particularly from the perspective of an endpoint device/agent. For example, a non-generic, specifically configured device (e.g., device 200) may perform procedure 700 by executing stored instructions (e.g., process 248). The procedure 700 may start at step 705, and continues to step 710, where, as described in greater detail above, the process (e.g., end user device 410/450 and/or agent process 415) establishes a VPN connection with a particular VPN gateway. In step 715, the process requests observability monitoring through the particular VPN gateway, where requesting results in a controller being informed about the particular VPN gateway and a domain of the particular VPN gateway. (Notably, as described above, requesting observability monitoring may either occur after establishing the VPN connection, or during an authentication portion of establishing the VPN connection.)

In greater detail, and as described above, step 715 may be based on two scenarios. In the first scenario, where the process is on an end user device that is in a different domain than the particular VPN gateway, requesting comprises: requesting monitoring parameters from the particular VPN gateway; receiving, from the particular VPN gateway, a token comprising monitoring parameters; and passing, to the controller, the token comprising the monitoring parameters, wherein the test specifics are based on the monitoring parameters. (Note also that in response to requesting monitoring parameters from the particular VPN gateway, the particular VPN gateway is configured to request permission for the process to perform testing, and the monitoring parameters may be based in part on the permission.) In the second scenario, where the process is on an end user device that is in a same domain as the particular VPN gateway, requesting comprises: sending a request to the controller to cause the controller to push the test specifics to the particular VPN gateway and the process for coordinated execution of the one or more tests.

In step 720, the process may then receive test specifics from the controller based on the particular VPN gateway and the domain of the particular VPN gateway, and in step 725 the process executes one or more tests to the particular VPN gateway based on the test specifics, as described above.

The simplified procedure 700 may then end in step 730, notably with the ability to continue monitoring and reporting test results, accordingly. Other steps may also be included generally within procedure 700. For example, such steps (or, more generally, such additions to steps already specifically illustrated above), may include: sending test results; receiving, from the controller, instructions to switchover to a new VPN gateway based on the one or more tests, and switching to a new VPN connection with the new VPN gateway in response to the instructions; and so on.

Figure 8:
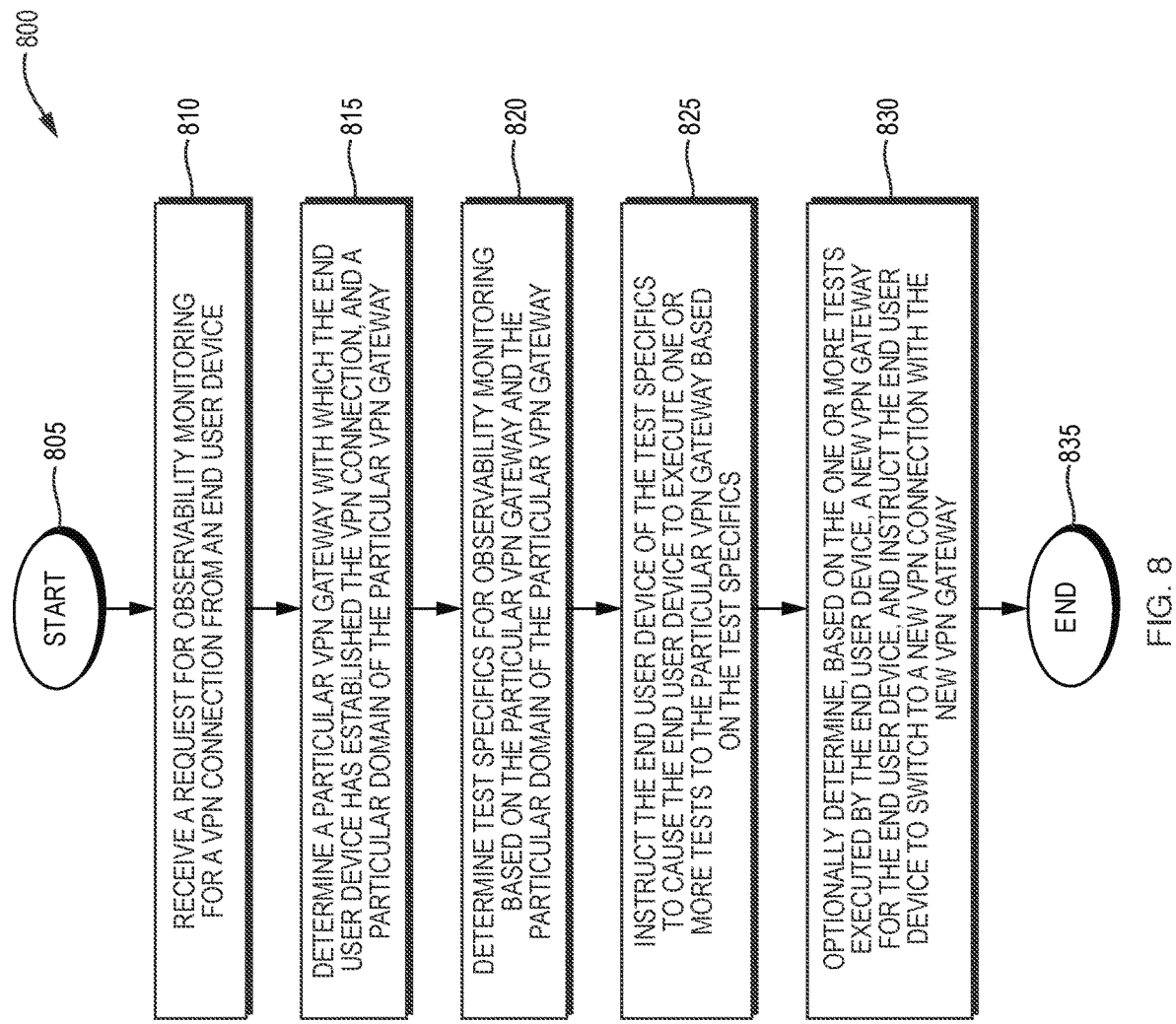
FIG. 8 illustrates another example simplified procedure for coordinated observability for dynamic VPN switchover in accordance with one or more embodiments described herein, particularly from the perspective of a server/controller.

In addition, FIG. 8 illustrates another example simplified procedure for coordinated observability for dynamic VPN switchover in accordance with one or more embodiments described herein, particularly from the perspective of a server/controller. For example, a non-generic, specifically configured device (e.g., device 200) may perform procedure 800 by executing stored instructions (e.g., process 248). The procedure 800 may start at step 805, and continues to step 810, where, as described in greater detail above, a controller (e.g., VPN controller 430) receives a request for observability monitoring for a VPN connection from an end user device. (As mentioned above, receiving the request for observability monitoring may occur after the VPN connection is established, or else during an authentication portion of establishing the VPN connection.)

In step 815, the controller may then determine a particular VPN gateway with which the end user device has established the VPN connection, and a particular domain of the particular VPN gateway. From this, the controller may then determine, in step 820, test specifics for observability monitoring based on the particular VPN gateway and the particular domain of the particular VPN gateway. As described in greater detail above, when the end user device is in a different domain than the particular VPN gateway, receiving the request for observability monitoring above comprises: receiving, from the end user device, a token comprising monitoring parameters obtained by the end user device from the particular VPN gateway, where the test specifics are based on the monitoring parameters. Otherwise, when the end user device is in a same domain as the particular VPN gateway, the end user device informs the controller of the particular VPN gateway, and the controller can determine the test specifics on its own volition.

In step 825, the controller may then instruct the end user device of the test specifics to cause the end user device to execute one or more tests to the particular VPN gateway based on the test specifics. Note that when the end user device is in a same domain as the particular VPN gateway, step 825 may also comprise pushing the test specifics to the particular VPN gateway for coordinated execution of the one or more tests.

Optionally, in certain embodiments, in step 830 the controller may also determine, based on the one or more tests executed by the end user device, a new VPN gateway for the end user device, and may instruct the end user device to switch to a new VPN connection with the new VPN gateway. For example, determining the new VPN gateway may be based on the new VPN gateway having better performance than the particular VPN gateway. For instance, when the end user device is in a same domain as the particular VPN gateway, the controller may receive test results from a plurality of VPN gateways of the particular domain, and may actually control a plurality of VPN sessions of the particular domain based on the test results from the plurality of VPN gateways.

As described above, when receiving test results from the particular VPN gateway (or from the plurality of VPN gateways), the results may comprise one or more gateway metrics, such as, e.g., a load profile of a VPN gateway cluster of the particular domain, active session information of the particular VPN gateway, fail over status of the particular VPN gateway, latency statistics of the particular VPN gateway, and underlay resource health of the particular VPN gateway, and so on.

The simplified procedure 800 may then end in step 835, notably with the ability to continue receiving test results, making decisions, and taking action(s) based thereon. Other steps may also be included generally within procedure 800. For example, such steps (or, more generally, such additions to steps already specifically illustrated above), may include: pushing the test specifics to the particular VPN gateway for coordinated execution of the one or more tests; receiving test results from the particular VPN gateway; receiving test results from the end user device based on the one or more tests to the particular VPN gateway, and presenting the test results regarding the one or more tests to the particular VPN gateway; and so on.

It should be noted that while certain steps within procedures 700-800 may be optional as described above, the steps shown in FIGS. 7-8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 700-800 are described separately, certain steps from each procedure may be incorporated into each other procedure, and the procedures are not meant to be mutually exclusive.

The techniques described herein, therefore, provide for coordinated observability for dynamic VPN switchover. In particular, the techniques herein determine if the end user and VPN gateway are in the same domain or different domains, and through a control-plane-based negotiation, allow a test controller in cloud to determine what are the test cases that can be orchestrate on the end point, in what traffic profile, and so on. By registering performance monitoring across domains (e.g., through a token exchange), the techniques herein allow correlation of performance metrics collected from different vantage points, leading to the ability to dynamically select VPN gateways to use for a given end user (or set of users) based on the collected performance metrics, without overburdening any particular VPN gateway (by not moving traffic to, or by offloading traffic from, congested or underperforming gateways).

In still further embodiments of the techniques herein, a business impact of the VPN gateway selections and switchovers can also be quantified. That is, because of issues related to specific applications/processes (e.g., lost traffic, slower servers, overloaded network links, etc.), various corresponding business transactions may have been correspondingly affected for those applications/processes (e.g., online purchases were delayed, page visits were halted before fully loading, user satisfaction or dwell time decreased, etc.), while other processes (e.g., on other network segments or at other times) remain unaffected. The techniques herein, therefore, can correlate the VPN gateway selections and switchovers with various business transactions in order to better understand the effect on the business transactions, accordingly.

Illustratively, the techniques described herein may be performed by hardware, software, and/or firmware, such as in accordance with the illustrative VPN switchover observability process 248, which may include computer executable instructions executed by the processor 220 to perform functions relating to the techniques described herein, e.g., in conjunction with corresponding processes of other devices in the computer network as described herein (e.g., on network agents, controllers, computing devices, servers, etc.). In addition, the components herein may be implemented on a singular device or in a distributed manner, in which case the combination of executing devices can be viewed as their own singular "device" for purposes of executing the process 248.

According to the embodiments herein, an illustrative method herein may comprise: establishing, by a process, a virtual private network connection (VPN connection) with a particular VPN gateway; requesting, by the process, observability monitoring through the particular VPN gateway, wherein requesting results in a controller being informed about the particular VPN gateway and a domain of the particular VPN gateway; receiving, by the process, test specifics from the controller based on the particular VPN gateway and the domain of the particular VPN gateway; and executing, by the process, one or more tests to the particular VPN gateway based on the test specifics.

In one embodiment, the method further comprises: receiving, from the controller, instructions to switchover to a new VPN gateway based on the one or more tests; and switching to a new VPN connection with the new VPN gateway in response to the instructions.

In one embodiment, the process is on an end user device that is in a different domain than the particular VPN gateway, and requesting comprises: requesting monitoring parameters from the particular VPN gateway; receiving, from the particular VPN gateway, a token comprising monitoring parameters; and passing, to the controller, the token comprising the monitoring parameters, wherein the test specifics are based on the monitoring parameters. In one embodiment, in response to requesting monitoring parameters from the particular VPN gateway, the particular VPN gateway is configured to request permission for the process to perform testing, and the monitoring parameters are based in part on the permission.

In one embodiment, the process is on an end user device that is in a same domain as the particular VPN gateway, and requesting comprises: sending a request to the controller to cause the controller to push the test specifics to the particular VPN gateway and the process for coordinated execution of the one or more tests.

In one embodiment, requesting observability monitoring occurs after establishing the VPN connection.

In one embodiment, requesting observability monitoring occurs during an authentication portion of establishing the VPN connection.

According to the embodiments herein, another illustrative method herein may comprise: receiving, at a controller, a request for observability monitoring for a virtual private network connection (VPN connection) from an end user device; determining, by the controller, a particular VPN gateway with which the end user device has established the VPN connection, and a particular domain of the particular VPN gateway; determining, by the controller, test specifics for observability monitoring based on the particular VPN gateway and the particular domain of the particular VPN gateway; and instructing, by the controller, the end user device of the test specifics to cause the end user device to execute one or more tests to the particular VPN gateway based on the test specifics.

In one embodiment, this method further comprises: determining, based on the one or more tests executed by the end user device, a new VPN gateway for the end user device; and instructing the end user device to switch to a new VPN connection with the new VPN gateway. In one embodiment, determining the new VPN gateway is based on the new VPN gateway having better performance than the particular VPN gateway. In one embodiment, the end user device is in a same domain as the particular VPN gateway, and the method further comprises: receiving test results from a plurality of VPN gateways of the particular domain; and controlling a plurality of VPN sessions of the particular domain based on the test results from the plurality of VPN gateways.

In one embodiment, the end user device is in a different domain than the particular VPN gateway, and receiving the request for observability monitoring comprises: receiving, from the end user device, a token comprising monitoring parameters obtained by the end user device from the particular VPN gateway, wherein the test specifics are based on the monitoring parameters.

In one embodiment, the end user device is in a same domain as the particular VPN gateway, and the method further comprises: pushing the test specifics to the particular VPN gateway for coordinated execution of the one or more tests.

In one embodiment, this method further comprises: receiving test results from the particular VPN gateway comprising one or more gateway metrics selected from a group consisting of: a load profile of a VPN gateway cluster of the particular domain; active session information of the particular VPN gateway; fail over status of the particular VPN gateway; latency statistics of the particular VPN gateway; and underlay resource health of the particular VPN gateway.

In one embodiment, receiving the request for observability monitoring occurs after the VPN connection is established.

In one embodiment, receiving the request for observability monitoring occurs during an authentication portion of establishing the VPN connection.

In one embodiment, this method further comprises: receiving test results from the end user device based on the one or more tests to the particular VPN gateway; and presenting the test results regarding the one or more tests to the particular VPN gateway.

According to the embodiments herein, an illustrative tangible, non-transitory, computer-readable medium herein may have computer-executable instructions stored thereon that, when executed by a processor on a computer, may cause the computer to perform a method comprising: establishing a virtual private network connection (VPN connection) with a particular VPN gateway; requesting observability monitoring through the particular VPN gateway, wherein requesting results in a controller being informed about the particular VPN gateway and a domain of the particular VPN gateway; receiving test specifics from the controller based on the particular VPN gateway and the domain of the particular VPN gateway; and executing one or more tests to the particular VPN gateway based on the test specifics.

In one embodiment the computer is an end user device that is in a different domain than the particular VPN gateway, and wherein requesting comprises: requesting monitoring parameters from the particular VPN gateway; receiving, from the particular VPN gateway, a token comprising monitoring parameters; and passing, to the controller, the token comprising the monitoring parameters, wherein the test specifics are based on the monitoring parameters.

In one embodiment, the computer is an end user device that is in a same domain as the particular VPN gateway, and wherein requesting comprises: sending a request to the controller to cause the controller to push the test specifics to the particular VPN gateway and the computer for coordinated execution of the one or more tests.

Further, according to the embodiments herein an illustrative apparatus herein may comprise: one or more network interfaces to communicate with a network; a processor coupled to the network interfaces and configured to execute one or more processes; and a memory configured to store a process that is executable by the processor, the process, when executed, configured to: establish a virtual private network connection (VPN connection) with a particular VPN gateway; request observability monitoring through the particular VPN gateway, wherein requesting results in a controller being informed about the particular VPN gateway and a domain of the particular VPN gateway; receive test specifics from the controller based on the particular VPN gateway and the domain of the particular VPN gateway; and execute one or more tests to the particular VPN gateway based on the test specifics.

While there have been shown and described illustrative embodiments above, it is to be understood that various other adaptations and modifications may be made within the scope of the embodiments herein. For example, while certain embodiments are described herein with respect to certain types of networks in particular, the techniques are not limited as such and may be used with any computer network, generally, in other embodiments. Moreover, while specific technologies, protocols, and associated devices have been shown, such as Java, TCP, IP, and so on, other suitable technologies, protocols, and associated devices may be used in accordance with the techniques described above. In addition, while certain devices are shown, and with certain functionality being performed on certain devices, other suitable devices and process locations may be used, accordingly. That is, the embodiments have been shown and described herein with relation to specific network configurations (orientations, topologies, protocols, terminology, processing locations, etc.). However, the embodiments in their broader sense are not as limited, and may, in fact, be used with other types of networks, protocols, and configurations.

Moreover, while the present disclosure contains many other specifics, these should not be construed as limitations on the scope of any embodiment or of what may be claimed, but rather as descriptions of features that may be specific to particular embodiments of particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Further, although features may be described above as acting in certain combinations and even initially claimed as such, one or more features from a claimed combination can in some cases be excised from the combination, and the claimed combination may be directed to a sub-combination or variation of a sub-combination.

For instance, while certain aspects of the present disclosure are described in terms of being performed "by a server" or "by a controller" or "by a collection engine", those skilled in the art will appreciate that agents of the observability intelligence platform (e.g., application agents, network agents, language agents, etc.) may be considered to be extensions of the server (or controller/engine) operation, and as such, any process step performed "by a server" need not be limited to local processing on a specific server device, unless otherwise specifically noted as such. Furthermore, while certain aspects are described as being performed "by an agent" or by particular types of agents (e.g., application agents, network agents, endpoint agents, enterprise agents, cloud agents, etc.), the techniques may be generally applied to any suitable software/hardware configuration (libraries, modules, etc.) as part of an apparatus, application, or otherwise.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method, comprising:
    establishing, by a process, a virtual private network (VPN) connection with a particular VPN gateway, wherein the end user device is in a different domain than the particular VPN gateway;
    requesting, by the process, observability monitoring through the particular VPN gateway, wherein requesting results in a controller being informed about the particular VPN gateway and a domain of the particular VPN gateway;
    receiving, by the process, test specifics from the controller based on the particular VPN gateway and the domain of the particular VPN gateway; and
    executing, by the process, one or more tests to the particular VPN gateway based on the test specifics.

2. The method as in claim 1, further comprising:
    receiving, from the controller, instructions to switchover to a new VPN gateway based on the one or more tests; and
    switching to a new VPN connection with the new VPN gateway in response to the instructions.

3. The method as in claim 1, wherein requesting comprises:
    requesting monitoring parameters from the particular VPN gateway;
    receiving, from the particular VPN gateway, a token comprising monitoring parameters; and
    passing, to the controller, the token comprising the monitoring parameters, wherein the test specifics are based on the monitoring parameters.

4. The method as in claim 3, wherein in response to requesting monitoring parameters from the particular VPN gateway, the particular VPN gateway is configured to request permission for the process to perform testing, and wherein the monitoring parameters are based in part on the permission.

5. The method as in claim 1, wherein the process is on an end user device that is in a same domain as the particular VPN gateway, and wherein requesting comprises:

sending a request to the controller to cause the controller to push the test specifics to the particular VPN gateway and the process for coordinated execution of the one or more tests.

6. The method as in claim 1, wherein requesting observability monitoring occurs after establishing the VPN connection.

7. The method as in claim 1, wherein requesting observability monitoring occurs during an authentication portion of establishing the VPN connection.

8. A method, comprising:
receiving, at a controller, a request for observability monitoring for a virtual private network (VPN) connection from an end user device;
determining, by the controller, a particular VPN gateway with which the end user device has established the VPN connection, and a particular domain of the particular VPN gateway, wherein the end user device is in a different domain than the particular VPN gateway;
determining, by the controller, test specifics for observability monitoring based on the particular VPN gateway and the particular domain of the particular VPN gateway; and
instructing, by the controller, the end user device of the test specifics to cause the end user device to execute one or more tests to the particular VPN gateway based on the test specifics.

9. The method as in claim 8, further comprising:
determining, based on the one or more tests executed by the end user device, a new VPN gateway for the end user device; and
instructing the end user device to switch to a new VPN connection with the new VPN gateway.

10. The method as in claim 9, wherein determining the new VPN gateway is based on the new VPN gateway having better performance than the particular VPN gateway.

11. The method as in claim 9, wherein the end user device is in a same domain as the particular VPN gateway, the method further comprising:
receiving test results from a plurality of VPN gateways of the particular domain; and
controlling a plurality of VPN sessions of the particular domain based on the test results from the plurality of VPN gateways.

12. The method as in claim 8, wherein receiving the request for observability monitoring comprises:
receiving, from the end user device, a token comprising monitoring parameters obtained by the end user device from the particular VPN gateway, wherein the test specifics are based on the monitoring parameters.

13. The method as in claim 8, wherein the end user device is in a same domain as the particular VPN gateway, the method further comprising:
pushing the test specifics to the particular VPN gateway for coordinated execution of the one or more tests.

14. The method as in claim 13, further comprising:
receiving test results from the particular VPN gateway comprising one or more gateway metrics selected from a group consisting of: a load profile of a VPN gateway cluster of the particular domain; active session information of the particular VPN gateway; fail over status of the particular VPN gateway; latency statistics of the particular VPN gateway; and underlay resource health of the particular VPN gateway.

15. The method as in claim 8, wherein receiving the request for observability monitoring occurs after the VPN connection is established.

16. The method as in claim 8, wherein receiving the request for observability monitoring occurs during an authentication portion of establishing the VPN connection.

17. The method as in claim 8, further comprising:
receiving test results from the end user device based on the one or more tests to the particular VPN gateway; and
presenting the test results regarding the one or more tests to the particular VPN gateway.

18. A tangible, non-transitory, computer-readable medium having computer-executable instructions stored thereon that, when executed by a processor on a computer, cause the computer to perform a method comprising:
establishing, by a process on an end user device, a virtual private network (VPN) connection with a particular VPN gateway, wherein the end user device is in a different domain than the particular VPN;
requesting observability monitoring through the particular VPN gateway, wherein requesting results in a controller being informed about the particular VPN gateway and a domain of the particular VPN gateway;
receiving test specifics from the controller based on the particular VPN gateway and the domain of the particular VPN gateway; and
executing one or more tests to the particular VPN gateway based on the test specifics.

19. The tangible, non-transitory, computer-readable medium as in claim 18, wherein requesting comprises:
requesting monitoring parameters from the particular VPN gateway;
receiving, from the particular VPN gateway, a token comprising monitoring parameters; and
passing, to the controller, the token comprising the monitoring parameters, wherein the test specifics are based on the monitoring parameters.

20. The tangible, non-transitory, computer-readable medium as in claim 18, wherein the computer is an end user device that is in a same domain as the particular VPN gateway, and wherein requesting comprises:
sending a request to the controller to cause the controller to push the test specifics to the particular VPN gateway and the computer for coordinated execution of the one or more tests.

* * * * *

UNITED STATES PATENT AND TRADEMARK OFFICE
CERTIFICATE OF CORRECTION

PATENT NO. : 11,916,701 B2
APPLICATION NO. : 17/502141
DATED : February 27, 2024
INVENTOR(S) : Rajesh Indira Viswanbharan et al.

It is certified that error appears in the above-identified patent and that said Letters Patent is hereby corrected as shown below:

In the Specification

Column 20, Line 30 amend as shown:
establishing, by a process of an end user device, a virtual private network Signed and Sealed this
Twenty-first Day of May, 2024

Katherine Kelly Vidal
*Director of the United States Patent and Trademark Office*